Nov. 17, 1953  G. A. SMITH  2,659,160
WELL SURVEYING INSTRUMENT
Filed Nov. 14, 1947
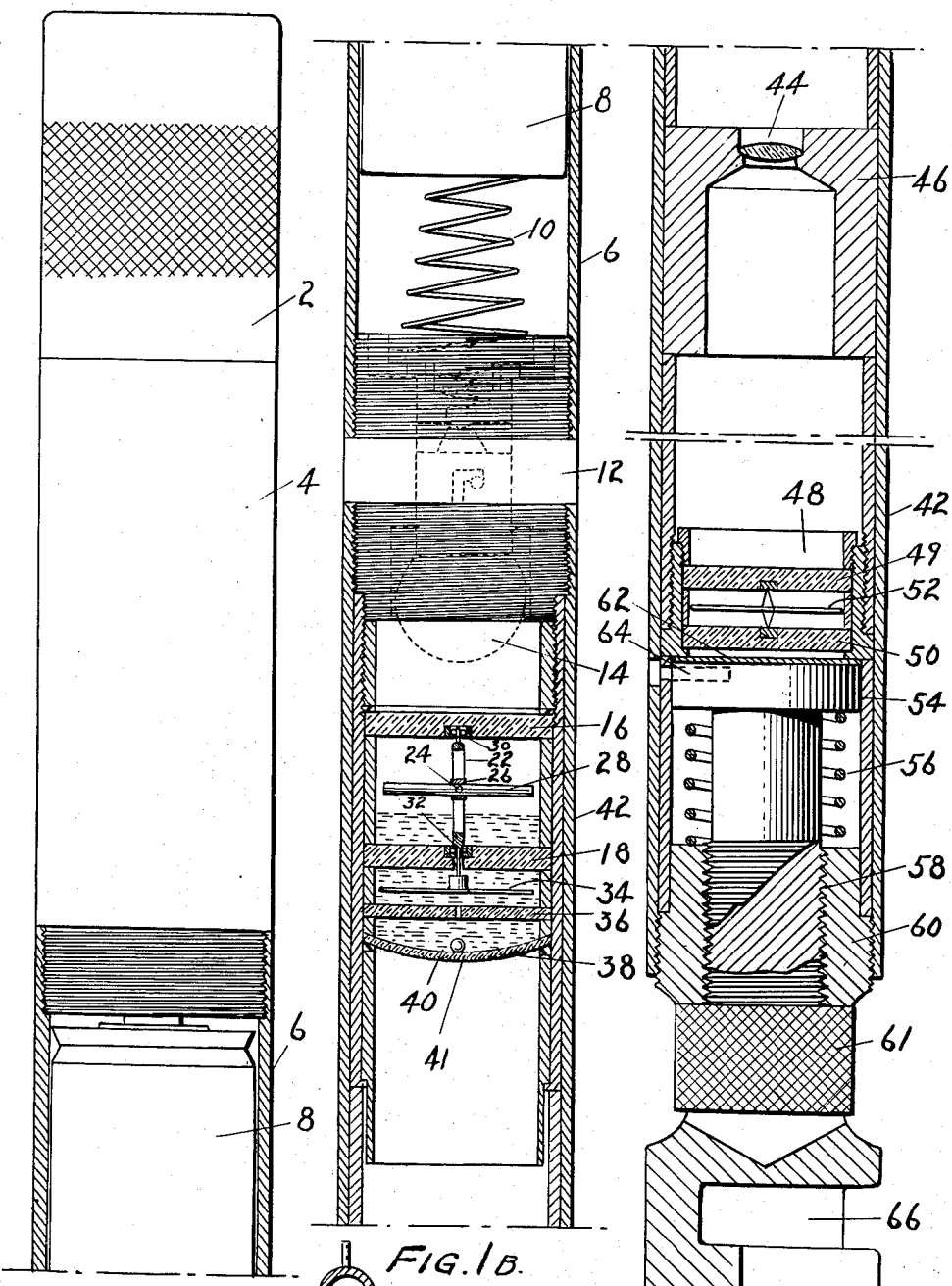
FIG. IA.   FIG. IB.   FIG. IC.
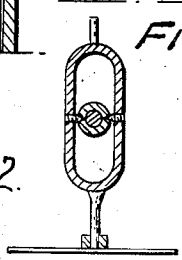
FIG. 2.
INVENTOR
George A. Smith
BY
Busser & Hardy
ATTORNEYS.

Patented Nov. 17, 1953

2,659,160

UNITED STATES PATENT OFFICE 2,659,160

WELL SURVEYING INSTRUMENT

George A. Smith, Philadelphia, Pa., assignor to Sperry-Sun Well Surveying Company, Philadelphia, Pa., a corporation of Delaware Application November 14, 1947, Serial No. 785,912

3 Claims. (Cl. 33—205.5)

This invention relates to well surveying instruments and has particular reference to an instrument designed for the recording of large angles of inclination.

Well surveying instruments containing compasses for indication of direction have heretofore been substantially limited with respect to the angles for which they can be used because of the nature of the mounting of the compass. At the present time, and particularly for directional drilling in which holes are intentionally deviated very substantially from the vertical, the usual well surveying instruments are frequently not usable since the range of operability of their compasses are exceeded. Various forms of compasses have been used. Those which are capable of maintaining a horizontal position of the compass needle or needles are the more satisfactory but the mountings of these compasses, whether they are floating or pivoted, impose limitations on their use. Sometimes the limitation is mechanical, i. e., when a large angle is reached a mounting which is suitably friction-free for slight angles of inclination from the vertical is such as either to interpose mechanical obstruction to the assumption by the compass of its horizontal position or imposes sufficient added friction to make the compass unreliable for indicating direction. Additionally, and sometimes forming the major limitation, a compass card or needle is thrown so far off the axis of the instrument or is tilted to such an extent that proper reading of the record is rendered difficult, if not impossible.

Compasses which consist of a magnetized needle secured rigidly at right angles to a spindle which is mounted parallel to or in, the axis of the instrument are also not usable at large angles, and, in fact, are more limited in their range than compasses which may assume horizontal positions, in view of the dip of the earth's magnetic field. For all angles of inclination except those bearing particular relationships to the earth's magnetic field, indicated directions will involve errors from the standpoint of direct readability, which errors, though correctable by the use of tables, are difficult to correct, particularly since the errors differ from point to point depending upon changes in the magnetic dip and it is necessary for interpretation of the records to take into account the local dip where the record is made.

It is an object of the present invention to provide a well surveying instrument which will function properly at large angles of deviation from the vertical as well as small angles. In brief, this end is accomplished by the use of a novel type of compass which is, for all practical purposes, substantially independent of local magnetic conditions and which, consequently, gives rise to a record which is directly readable.

Further objects of the invention relate to the association of such compass with other parts of a well surveying instrument whereby a simple construction results, capable of operation in substantially the same general fashion, from the standpoint of the operator, as surveying instruments now in common use. Still another object of the invention relates to the provision of an instrument which may be used for tool orientation purposes in connection with directional drilling in holes deviating at large angles from the vertical.

These and other objects relating in particular to features of construction of the surveying apparatus will become apparent from the following description read in conjunction with the accompanying drawing in which:

Figures 1A, 1B and 1C are respective views, partly in section, showing the improved instrument from the upper to the lower ends thereof respectively; and Figure 2 is a fragmentary view, partly in section, showing details of the compass construction.

At the upper end of the instrument there is a cap 2 surmounting and enclosing the upper portion of a timing mechanism contained in a section 4 of the instrument. This timing mechanism may be of any conventional type and its details do not constitute any part of the present invention. It may desirably be of the type illustrated in detail in the application of Roland Ring, Serial No. 629,052, filed November 16, 1945, being arranged to delay the closure of an electrical illumination circuit for a predetermined time and then to close the circuit for a limited time for the purpose of providing a photographic exposure. As described in said Ring application the timing means is set and simultaneously wound by the manipulation of a knob enclosed by the cap 2 and is in circuit with a series of batteries 8 enclosed within a tubular portion 6 of the casing, grounding the upper pole of these batteries at the time when exposure is to be effected.

To provide illumination there is in series with the batteries a lamp 14 mounted in a coupling 12 and arranged through suitable intermediate elements and a spring 10 for electrical inclusion in the circuit. The particular arrangement of the lamp may be conventional and forms no part of the present invention. It will suffice for present purposes to state that the lamp, illumination of which is controlled as indicated above, is located above a compass assembly now to be described.

The compass assembly indicated in Figure 1B comprises a pair of glass partitions 16 and 18 suitably spaced by a tube, the upper partition 16 being of opal glass or frosted so as to furnish a substantially uniformly illuminated disc. Alternatively, this partition may be of clear transparent glass if the bulb is frosted so as to provide a relatively large source of light to avoid the casting of a noticeable shadow by the compass needle. Mounted between the glass partitions is a spindle 22 supported preferably in ball bearings 30 and 32 fixed in the partitions. The spindle 22 is preferably bifurcated and between the legs of the spindle there is pivoted a ring 26 in which is fixedly mounted a magnetized needle 28. It will, of course, be evident that the magnetic needle may be replaced by a plurality of needles arranged in parallelism and mounted on an axis perpendicular to the upright axis of the spindle.

The arrangement described is such that the needle, or equivalent needle system, has its magnetic axis substantially horizontal at all times with its center of balance substantially coincident with the transverse axis of the pivot pins 24 mounting the ring 26. It is to be noted that this involves the mechanical center of gravity being displaced from this axis inasmuch as the torque exerted due to the dip of the earth's magnetic field must be balanced by the gravitational torque about the transverse axis. As a matter of fact, this would mean that the needle would be horizontal only where the dip and/or strength of the magnetic field of the earth had particular values; however, over quite large areas, such as all of the oil producing areas in the southwestern part of the United States, there is insufficient variation of the earth's magnetic field to cause a needle so mounted to deviate substantially from the horizontal. Minor deviations from horizontal are immaterial in the case of the present construction and within the area indicated the resulting differences in the azimuthal indications of the instrument will be well within the permissible errors of such an instrument and will not require corrections to be made. Accordingly, for simplicity of description, it may be assumed that the needle remains substantially horizontal, it being understood, of course, that deviations such as indicated may exist in particular locations. It should be stressed that the needle system, however, should not be pendulous, i. e., its horizontal position should not be maintained because its center of gravity is below its axis of support; its mechanical center of gravity should be, except for the deviations from horizontal just noted, in the horizontal plane of the axis of the supporting pivots.

The result of the needle construction just described is that, in any position of inclination of the instrument and of the spindle, the axis of which is coincident with, or at any rate parallel to, the axis of the instrument, the magnetic axis of the needle or needle system will lie in a vertical plane parallel to the earth's field, i. e., the magnetic axis of the needle or needle system will point in a magnetic north-south direction. The spindle will then necessarily take an equilibrium position consistent with horizontal or approximately horizontal position of the magnetic axis of the needle or needle system in such plane.

The lower end of the spindle extends downwardly through the partition 18 and carries a compass card 34 which is preferably translucent, carrying at its periphery on its lower side suitable indications of degrees though, if desired, it may carry only a single marking indicating a north-south direction. The markings on this compass card, if degrees are indicated may be of two forms. The degree markings may be equally spaced in which case they may be used directly for approximate indications of directions while accurate, true indications of direction may require the making of minor corrections from a table depending upon the inclination and direction of inclination first directly read from the record. Secondly, and preferably, the degree markings are not equally spaced but rather are so engraved thereon that direct reading of the record is possible.

Below the disc 34 there is a transparent diaphragm 36 forming the upper cover of a ball chamber the lower side of which is constituted by a lens 38, the upper surface of which is spherical to support a metallic ball 40 in such fashion that despite the inclination of the instrument the ball will always lie directly below the center of curvature of the spherical surface. The lower side of the lens 38 is provided with concentric circles engraved therein as indicated at 41, these circles indicating by coincidence with the center of the ball the degree of inclination.

While a spherical surface on which the ball rolls is generally satisfactory it may be that in an instrument designed to indicate not only large angles of inclination but also to indicate smaller angles there will be desirably a greater sensitivity of indication of the smaller angles, i. e., the radial displacement of the ball along the surface for a given angular change in the region of small angles of inclination will be greater than in the region of larger angles of inclination. In such case the upper surface of the lens will not be spherical but will consist of a surface of revolution about the axis of the instrument with a maximum radius of curvature at the axis, this radius of curvature decreasing toward the periphery. It may, for example, be spheroidal in which case the coaxial circles, indicating the degrees of inclination, will be more crowded at the periphery than at the center.

The foregoing construction, as will be evident, is capable of operation at large angles of inclination. So far as the compass is concerned the needle may be readily mounted so as to clear the spindle and the partitions even at quite large angles of inclination, larger than would be the case with dimensions as in Figure 1B which represents the construction which may be adopted for angles of inclination up to approximately 40°. In fact, by increasing the height of the space in the spindle the needle may be free to revolve through 360° about its mounting axis though desirably such rotation is prevented and confined to less than 180° to prevent the possible though unlikely occurrence of indeterminate positions. The spherical surface 41 may also be made of any desired radius of curvature so that the ball will properly indicate even large angles of inclination. In fact, if it is desired to indicate large angles with a high degree of sensitivity as compared with lower angles the spheroidal nature of the ball supporting surface may be changed in a fashion opposite that previously mentioned to the end that it has a small radius of curvature near the axis and a large radius at the periphery.

The chamber between the lens 38 and the upper partition 16 desirably contains transparent liquid for damping, acting for this purpose upon the compass card 34 and the ball 40. The liquid, however, should not rise to the level of the needle system on which its buoyant action would be undesirable unless, as may be the case, the needle system is balanced under immersion conditions in which case the conditions outlined for the center of gravity should be applied to the force center resulting from the combined actions of gravity on the needle system and the buoyant forces of the liquid. An opening through the partition 36 and the opening at the bearing through the partition 18 serve to permit free seepage of the liquid between the various chambers to take care of expansion and contraction due to changes in temperature. The various partitions are properly separated as indicated by tubes, all assembled and located within tubular portion 42 of the casing.

Below the compass and ball arrangements heretofore described there is a lens 44 arranged to project an image of the compass card, the ball and the coaxial markings 41 upon a sensitized record disc. The aperture of the lens 44 is desirably sufficiently small so that sharp images of these elements are projected on the record disc despite their different distances from the lens. The ball is, of course, projected as a shadow on the illuminated background formed either by the disc 34, if it is translucent, or by the partition 16 if the disc or card 34 is transparent. Preferably the card 34 is translucent whereby there is substantially entirely avoided any shadow of the compass needle or needle system.

Below the lens 44, which is mounted in the member 46, is a compass assembly immediately above the record disc 62. This assembly consists of a pair of transparent partitions 49 and 50 assembled in a carrier and held in place by a ring 48. In jewel bearings in these partitions there is mounted a compass needle 52. This compass 52 is arranged for use in carrying out the method of orientation described in the patent to Hyer 2,120,670 dated June 14, 1938, and, inasmuch as in carrying out said method, it is subject to attraction by a powerful magnet, it is not necessary that it be delicately mounted nor that any precautions be taken even when used at high angles of inclination for maintaining it against variable conditions due to the dip or changes of strength of the earth's magnetic field. The lower edge of this compass assembly may form an abutment against which the record disc 62 is pressed. This compass may, in ordinary surveying, be omitted though its presence is unobjectionable.

The record disc 62 is arranged to be entered into the instrument through a slot arrangement 64 and is adapted to be pressed upwardly into a light-tight position by a plunger 54 pressed upwardly by a spring 56 and arranged to be manipulated by a knob 61, the stem of the plunger being threaded, as indicated at 58, into the lower plug 60 of the instrument. This lower plug is provided with a T-slot 66 whereby the instrument may be supported in a protective casing upon a stem spring mounted for shock absorbing purposes.

The operation of the instrument for surveying is essentially similar to the operation of photographic instruments in common use and need not be described in detail. During the recording action, determined by the setting of the timing mechanism, the bulb 14 furnishes the illumination for the projection of an image of the lens 44 upon disc 62 which, when the plunger 54 is up in slot-closing position, will be in focus with the compass card 34 and the ball 40.

When orientation is being accomplished in accordance with said Hyer patent, the compass 52 will be attracted by a magnet carried by the lower end of the drill stem and a shadow of this compass will be projected upon the record disc. The relationship of this shadow to the image of the compass card will then give the orientation of the tool in the usual fashion.

It will, of course, be clear that at least those parts of the apparatus in the vicinity of the magnet needles must be of non-magnetic material.

While a particular embodiment of the invention has been described it will be clear that various changes in construction may be made, as will be evident to those skilled in the art, without departure from the invention as defined in the following claims.

What I claim and desire to protect by Letters Patent is:

1. A well surveying instrument comprising a casing of a form adapted to be lowered into a bore hole, means for mounting a sensitized record member within said casing and transversely of the axis of said casing, a compass mounted within said casing, said compass comprising a spindle, means mounting said spindle for rotation about an axis extending in the direction of the axis of the casing and a magnetized needle mounted on said spindle for rotation about an axis perpendicular to the axis of the spindle, said needle being substantially non-pendulous and balanced to occupy at all times a substantially horizontal position irrespective of slope of the casing, and means mounted within said casing including illuminating means and a lens for projecting on said record member an image to record the position of said spindle relative to said casing.

2. A well surveying instrument comprising a casing of a form adapted to be lowered into a bore hole, means for mounting a sensitized record member within said casing and transversely of the axis of said casing, a compass mounted within said casing, said compass comprising a spindle, means mounting said spindle for rotation about an axis extending in the direction of the axis of the casing and a magnetized needle mounted on said spindle for rotation about an axis perpendicular to the axis of the spindle, said needle being substantially non-pendulous and balanced to occupy at all times a substantially horizontal position irrespective of slope of the casing, a compass card carried by said spindle and means including illuminating means and a lens for projecting on said record member an image of said compass card to record the position of said spindle relative to said casing.

3. A well surveying instrument comprising a casing of a form adapted to be lowered into a bore hole, means for mounting a sensitized record member within said casing and transversely of the axis of said casing, a compass mounted within said casing, said compass comprising a spindle, means mounting said spindle for rotation about an axis extending in the direction of the axis of the casing and a magnetized needle mounted on said spindle for rotation about an axis perpendicular to the axis of the spindle, said needle being substantially non-pendulous and balanced to occupy at all times a substantially horizontal position irrespective of slope of the casing, inclination responsive means located within said casing adjacent to said compass, and means including illuminating means and a lens for projecting on said record member a combined image to record the position of said spindle relative to said casing and the inclination of said casing.

GEORGE A. SMITH.

References Cited in the file of this patent

UNITED STATES PATENTS

| Number | Name | Date |
|---|---|---|
| 332,780 | Blanchard | Dec. 22, 1885 |
| 1,016,732 | Berger | Feb. 6, 1912 |
| 1,533,683 | Abbot | Apr. 14, 1925 |
| 1,889,921 | Jakosky | Dec. 6, 1932 |
| 2,098,476 | Webster | Nov. 9, 1937 |
| 2,120,670 | Hyer | June 14, 1938 |
| 2,144,422 | Anderson | Jan. 17, 1939 |
| 2,338,029 | Doll | Dec. 28, 1943 |

FOREIGN PATENTS

| Number | Country | Date |
|---|---|---|
| 9,496 | Great Britain | 1893 |
| 74,273 | Germany | 1894 |
| 10,511 | Great Britain | 1907 |
| 377,549 | Germany | 1923 |